June 3, 1952     H. W. BOUSMAN     2,599,156
THERMAL NEUTRON DETECTOR ELEMENT
Filed Jan. 3, 1950
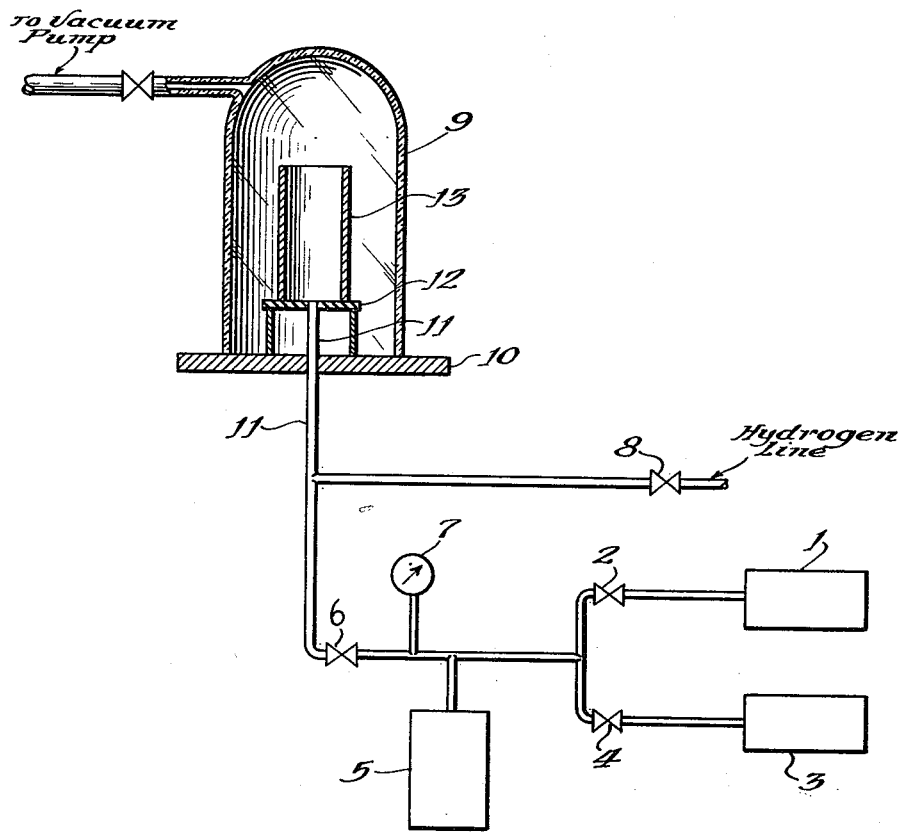
INVENTOR.
Henry W. Bousman
BY
Roland A. Anderson
Attorney:

Patented June 3, 1952

2,599,156

UNITED STATES PATENT OFFICE 2,599,156

THERMAL NEUTRON DETECTOR ELEMENT

Henry W. Bousman, Scotia, N. Y., assignor, by mesne assignments, to the United States of America as represented by the United States Atomic Energy Commission Application January 3, 1950, Serial No. 136,601

7 Claims. (Cl. 313—93)

The present invention relates to members used in radiation detection instruments and more particularly to members used in instruments for detecting or counting thermal neutrons.

In the past it has been common practice in detecting or measuring thermal neutrons to utilize an intermediate reaction in the course of which ionized particles are produced by the neutrons. For example, it has been proposed to permit neutrons to react with boron 10 or lithium 6, either of which atom will give off an alpha particle upon reacting with a thermal neutron. The heavy alpha particle is then more easily counted or measured than the non-ionizing neutron.

Since the natural distribution of the isotope boron 10 in boron is only about 18.4 per cent, and the natural distribution of the isotope lithium 6 in lithium is only about 7.5 per cent, it has been proposed to use as a neutron reactive substance a material which has been substantially enriched in either $B^{10}$ or $Li^6$. Thus devices have been constructed as for example, the one shown in U. S. Patent 2,288,718 to Kallmann et al., in which several cylinders adjacent to an electrometer tube are coated with a neutron-reactive element which has been enriched with a neutron-reactive isotope.

It is an object of the present invention to increase the sensitivity and accuracy of devices used in detecting or counting thermal neutrons. It is a further object of the present invention to provide a member for use in a device for detecting or counting thermal neutrons upon which a neutron-reactive isotope is arranged so as to give increased efficiency in counting or detecting thermal neutrons.

A still further object of the present invention is to provide a new and better electrode for use in a thermal neutron detector or counter.

The above objects are attained by coating a member for use in a neutron counter with two layers, the first layer comprising a neutron-reactive element not enriched with its neutron-reactive isotope and the outermost layer comprising a neutron-reactive element enriched with its neutron-reactive isotope.

For example, in the formation of a boron coating on a steel member to be used in a neutron counter, it has been found that adherent coatings are obtained only at temperatures sufficiently high that some diffusion of boron into the steel occurs. Since boron atoms of mass 10 have a large capture cross-section for neutrons of thermal energy and after capture give rise to alpha particles, it will be readily seen that such boron atoms of mass 10 as diffuse into the steel will emit an alpha particle if a thermal neutron is absorbed. Since such atoms are removed from the surface of the steel member, however, the alpha particle is often not detectable because of its very limited range in steel. In the operation of the present invention the steel member to be used in a neutron counter is first coated with ordinary boron or even with boron which has been enriched with respect to the isotope of mass 11 which does not readily absorb thermal neutrons. After sufficient boron has been deposited to form a distinct film, a coating of boron which has been enriched with respect to mass 10 is added. Thus, the neutron-reactive atoms are in the main disposed on the outer layer of the coating in such a position that the alpha particles emitted may be readily detected and a minimum of the alpha particles are absorbed in passing through solid media. It will be obvious to those skilled in the art that the principle of the present invention is applicable regardless of the nature of the article being coated, since any substance beneath the outer layer which will capture thermal neutrons will serve to reduce both the number of detectable alpha particles and the number of neutrons remaining to be captured by the outer layer.

The principle of the present invention may be incorporated into coated articles of various shapes and various materials for use in devices for detecting or counting thermal neutrons. For example, the article so coated may be a cylindrical member, a tube-shaped member, a flat plate or a cup-shaped member among others. The article so coated may consist of any suitable material which can be formed into the desired shape.

Likewise the coating may be accomplished in any suitable manner, such as applying the boron in elemental or compound form with an organic binder or by a gas pyrolysis process similar to that disclosed for coating with boron in U. S. Patent 2,307,005 to Ruben.

As will be apparent to one skilled in the art, it will in some instances be desirable to form the two layer coating on only one side of the member to be used in a neutron counter, and in some instances it will be desirable to form the coating on both sides, depending on the structural features of the counter. For example, it may be desired to form the present coating on one or on both sides of a flat plate or on the interior surface or on both the interior and exterior surfaces of a tube-like member.

For purposes of illustration, the coating of a typical member for use in a neutron counter will be described. Referring to Fig. 1, which represents one method of accomplishing the coating of the present invention, 13 represents a cylindrical steel tube upon the interior surface of which it is desired to place a coating of boron. So coated, the tube 13 will be suitable for use as one electrode of a neutron counter. Tube 13 is supported on Mycalex support plate 12 inside evacuated bell jar 9 on metal base plate 10. Storage vessels 1 and 3 contain diborane made from natural boron and diborane enriched with respect to the isotope $B^{10}$ respectively. Metal tube 11 is provided with an orifice at its end inside bell jar 9. Tube 13 is heated by induction from a coil (not shown) around bell jar 9. A suitable source of hydrogen is connected to needle valve 8. 2, 4, and 6 are also needle valves, and 7 denotes a pressure gauge.

To deposit boron, hydrogen is admitted through valve 8 while the vacuum pump is in operation and tube 13 is heated to about 700° C. in the flowing hydrogen atmosphere. Next, tube 13 is cooled to about 400° C. and a measured amount of diborane is allowed to pass through valve 2 into a tank of known volume 5. Meanwhile the hydrogen continues to flow through valve 8 and to be pumped away at such a rate that the pressure in bell jar 9 is about 2 mm. of mercury. Valve 6 is opened slowly to admit diborane at a rate which limits the pressure in bell jar 9 to about 4–5 mm. of mercury. When substantially all of the diborane in tank 5 is exhausted, valve 6 is closed, and enriched diborane is admitted in the desired amount through valve 4. Valve 6 is then opened to allow deposition of the enriched material under the same pressure conditions as used for the natural diborane.

The steel tube thus treated has on the inside surface a base layer of ordinary boron and a top layer of boron enriched in the isotope $B^{10}$. As such, the tube is well suited for use as an electrode in a thermal neutron counter. It will be apparent to one skilled in the art that the above or some other suitable procedure may be used to coat elements of various shapes and materials with boron for use in connection with neutron counters.

I claim:
1. An article having a base coat containing a thermal neutron-reactive element unenriched with respect to the thermal neutron-reactive isotope and a surface coat in intimate contact therewith containing said thermal neutron-reactive element enriched with respect to said thermal neutron-reactive isotope.

2. An article as recited in claim 1 where the thermal neutron-reactive element is boron.

3. An article as recited in claim 1 where the thermal neutron-reactive element is lithium.

4. An article having a base coat containing boron substantially devoid of the isotope $B_5^{10}$ and a surface coat in intimate contact therewith containing boron enriched with respect to the isotope $B_5^{10}$.

5. In an instrument for detecting thermal neutrons an electrode having a base coat containing boron unenriched with respect to the isotope $B_5^{10}$ and a surface coat in intimate contact therewith containing boron enriched with respect to the isotope $B_5^{10}$.

6. In an instrument for detecting thermal neutrons an electrode having a base coat containing boron substantially devoid of the isotope $B_5^{10}$ and a surface coat in intimate contact therewith containing boron enriched with respect to the isotope $B_5^{10}$.

7. A cylindrical tube for use as an electrode in a slow neutron detector, said tube having on the interior thereof a base coat of boron unenriched with respect to the isotope $B_5^{10}$ and a surface coat in intimate contact therewith of boron enriched with respect to the isotope $B_5^{10}$.

HENRY W. BOUSMAN.

REFERENCES CITED

The following references are of record in the file of this patent:

UNITED STATES PATENTS

| Number | Name | Date |
| --- | --- | --- |
| 2,288,718 | Kallmann et al. | July 7, 1942 |
| 2,398,934 | Hare | Apr. 23, 1946 |
| 2,462,471 | Crumrine | Feb. 22, 1949 |